US007327561B2

(12) United States Patent
Chen

(10) Patent No.: US 7,327,561 B2
(45) Date of Patent: Feb. 5, 2008

(54) ELECTRICAL DEVICE FOR ADJUSTING THE ANGLE BETWEEN A TOP MODULE AND A BOTTOM MODULE

(75) Inventor: Wen-Tsan Chen, Yun-Lin Hsien (TW)

(73) Assignee: Chi Mei Communication Systems, Inc., Jen Te Shiang, Tai-Nan County (TW)

( * ) Notice: Subject to any disclaimer, the term of this patent is extended or adjusted under 35 U.S.C. 154(b) by 283 days.

(21) Appl. No.: 10/904,544

(22) Filed: Nov. 16, 2004

(65) Prior Publication Data

US 2006/0044747 A1 Mar. 2, 2006

(30) Foreign Application Priority Data

Aug. 27, 2004 (TW) .............................. 93125966 A

(51) Int. Cl.
*G06F 1/16* (2006.01)
(52) U.S. Cl. ...................................... 361/681; 361/683
(58) Field of Classification Search ................ 361/681, 361/683
See application file for complete search history.

(56) References Cited

U.S. PATENT DOCUMENTS

| 5,168,423 | A | * | 12/1992 | Ohgami et al. | ............. | 361/681 |
| 6,980,424 | B2 | * | 12/2005 | Kim et al. | ................... | 361/683 |
| 7,055,219 | B2 | * | 6/2006 | Shiba | ........................... | 16/367 |
| 7,096,540 | B2 | * | 8/2006 | Watanabe et al. | ............. | 16/367 |
| 2002/0167789 | A1 | * | 11/2002 | Novin et al. | ................ | 361/681 |
| 2004/0090740 | A1 | * | 5/2004 | Tseng et al. | ................ | 361/683 |
| 2005/0207104 | A1 | * | 9/2005 | Love | ........................... | 361/683 |

* cited by examiner

*Primary Examiner*—Yean-Hsi Chang
(74) *Attorney, Agent, or Firm*—Jeffrey T. Knapp; Wei-Te Chung

(57) ABSTRACT

An electrical device includes a top module having a panel for displaying an image, a bottom module having a plurality of buttons for controlling the operation of the electrical device, a base affixed on the bottom module, a first pivot extending out of the base, a rotation supporter installed on the first pivot, and a second pivot installed on the rotation supporter. The top module is rotatably affixed to the second pivot. The second pivot includes a protrusion for propping up the stopper of the flexible member as the top module rotates around the second pivot by a predetermined angle to maintain the predetermined angle between the top module and the bottom module.

16 Claims, 17 Drawing Sheets

ELECTRICAL DEVICE FOR ADJUSTING THE ANGLE BETWEEN A TOP MODULE AND A BOTTOM MODULE

BACKGROUND OF INVENTION

1. Field of the Invention

The present invention relates to an electrical device, and more specifically, to an electrical device that forms a specific angle between a top module and a bottom module as the top module is unfolded.

2. Description of the Prior Art

With the popularization of convenient mobile phone devices for routine communications among people in the modern information society, people are able to exchange information, share experiences and communicate with each other anywhere and anytime. Conventional mobile phones have integrated more and more functions, such as listening to broadcasts, playing games, taking photos, and receiving electronic mail and SMS messages. In other words, mobile phones are not just communication tools, but also portable electronic devices with multiple functions.

Please refer to FIG. 1, which is a diagram of the mobile phone 10 according to prior art. The mobile phone 10 contains a top module 12 having a display panel 11 for displaying images, a bottom module 14 having a plurality of buttons 18 for controlling the operation of the mobile phone 16, and a connection device 16 for rotatably unfolding the top module 12 and the bottom module 14 by the angle of 180 degrees between the top module 12 and the bottom module 14 as shown in FIG. 1. Because the aspect ratio of length to width for images displayed by the display panel 11 in the condition which FIG. 1 illustrates is 16:9 (or 4:3), that is, the width is narrower, it is desirable to be able to rotate the mobile phone 10 to another orientation so that the aspect ratio of length to width for images displayed by the display panel 11 is 9:16 (or 3:4). It is more suitable for a user to read text, for example electronic mail, in such a display image ratio. It is not ergonomically suitable for a mobile phone to have an included angle of 180 degrees between the top module 12 and the bottom module 14. For that reason, it is desirable to improve the mobile phone.

SUMMARY OF INVENTION

It is therefore a primary object of the claimed invention to provide an electrical device that the top module and the bottom module form the included angle of 160 degrees to meet the demand of ergonomics as the top module is unfolded.

According to the claimed invention, an electrical device includes a top module having a panel for displaying an image, a bottom module having a plurality of buttons for controlling the operation of the electrical device, a base affixed on the bottom module, a first pivot extending out of the base, a rotation supporter installed on the first pivot, and a second pivot installed on the rotation supporter. The top module is rotatably affixed to the second pivot. The second pivot includes a protrusion for propping up a stopper of a flexible member as the top module rotates around the second pivot by a predetermined angle to maintain the predetermined angle between the top module and the bottom module.

According to the claimed invention, an electrical device includes a top module having a panel for displaying image, a bottom module having a plurality of buttons for controlling the operation of the electrical device, a base fixed on the bottom module, a first pivot extending out of the base, a flexible member connected to the first pivot having a stopper, a rotation supporter installed on the first pivot, a second pivot installed on the rotation supporter, and a protrusion having a first block portion and a second block portion. The top module is rotatably affixed to the second pivot. The first block portion of the protrusion is used for propping up the stopper of the flexible member as the top module rotates around the second pivot by a predetermined angle to maintain the predetermined angle between the top module and the bottom module. The second block portion of the protrusion is used for propping up the stopper of the flexible member as the top module rotates around the first pivot.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
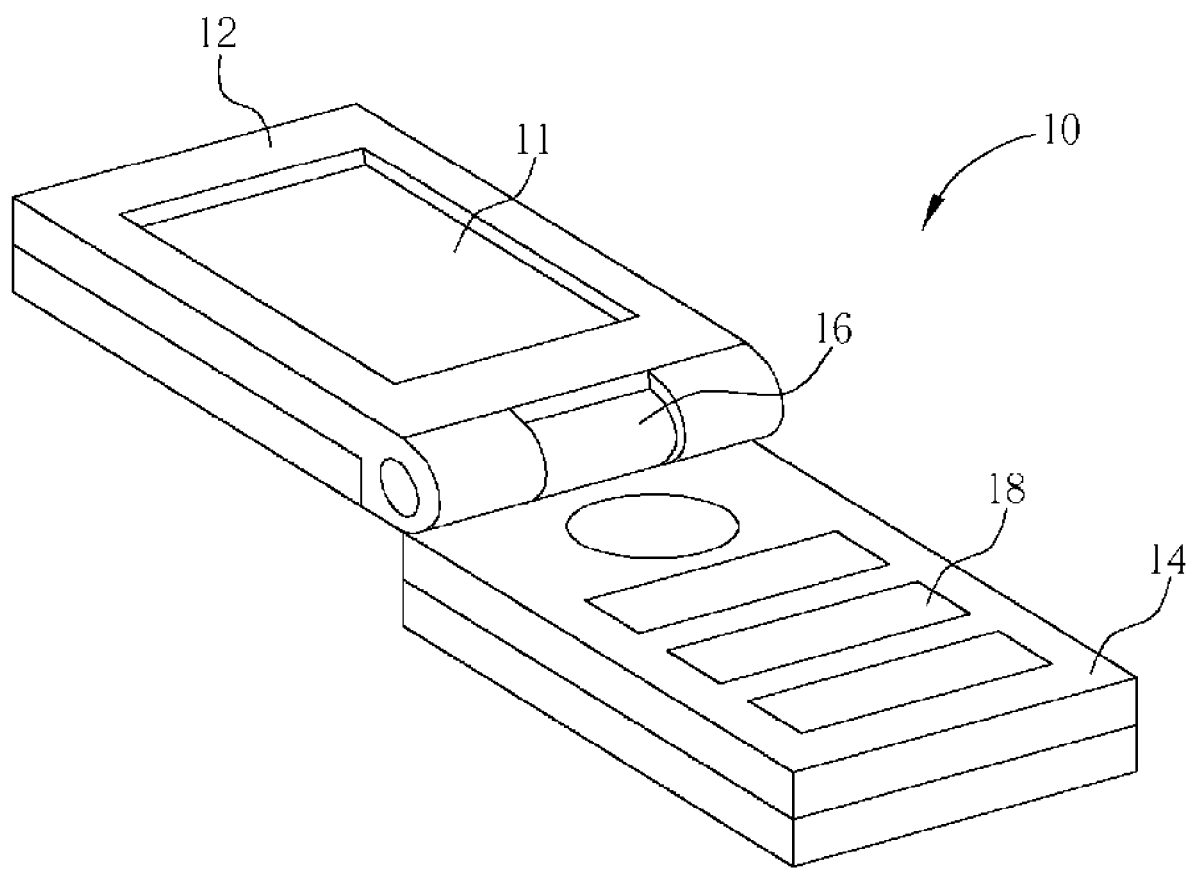
FIG. 1 is a diagram of the mobile phone according to the prior art.
Figure 2:
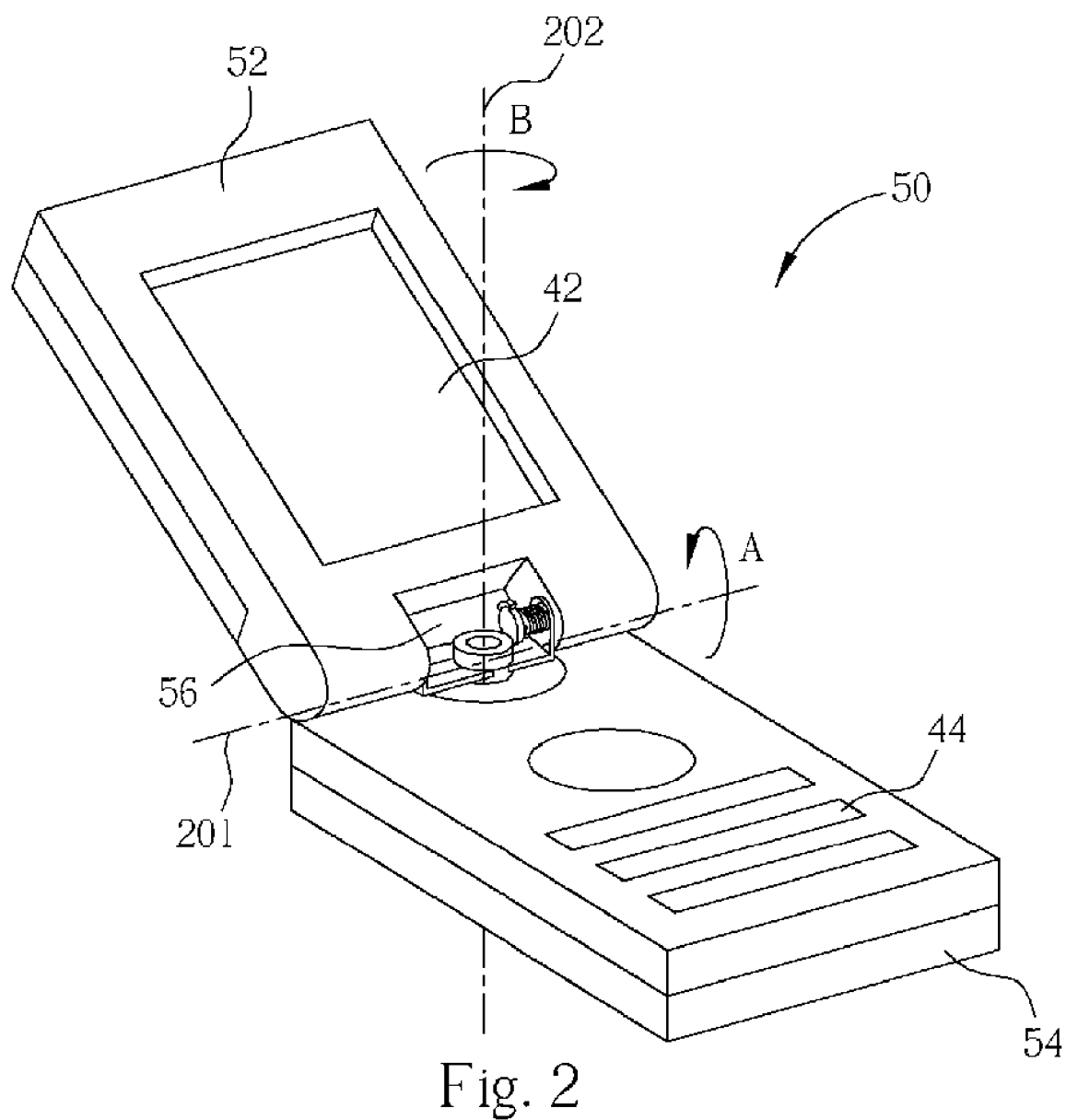
FIG. 2 shows the mobile phone according to the present invention.
Figure 3:
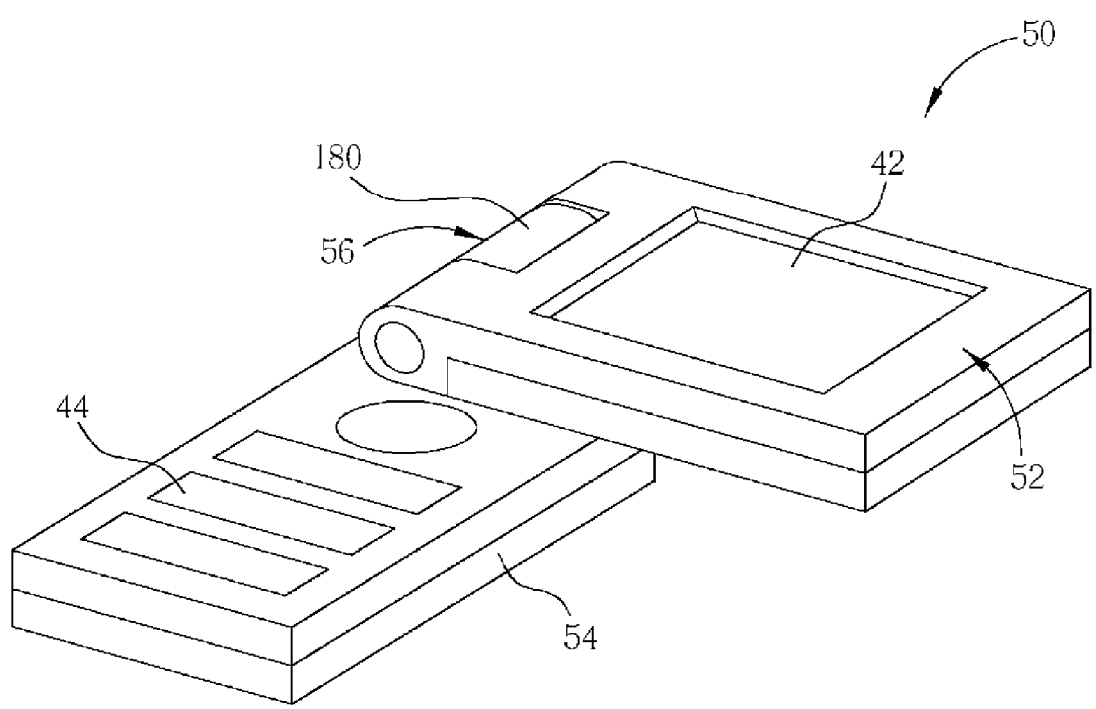
FIG. 3 is a diagram of the top module of the mobile phone of FIG. 2 rotated 90 degrees along the arrow B.

Please refer to FIG. 2 and FIG. 3. FIG. 2 shows the mobile phone 50 according to the present invention. FIG. 3 is a diagram where the top module 52 of the mobile phone 50 has been rotated 90 degrees along the arrow B. The mobile phone 50 comprises a top module 52 having a panel 42 for displaying images, a bottom module 54 having a plurality of buttons 44 for controlling the operation of the mobile phone 50, and a connection device 56 for coupling the top module 52 with the bottom module 54. The included angle between the top module 52 and the bottom module 54 is substantially 160 degrees after the top module 52 rotates along the arrow A shown in FIG. 2. Then, the top module 52 can be rotated 90 degrees in the direction of arrow B as shown in FIG. 3.

Figure 4:
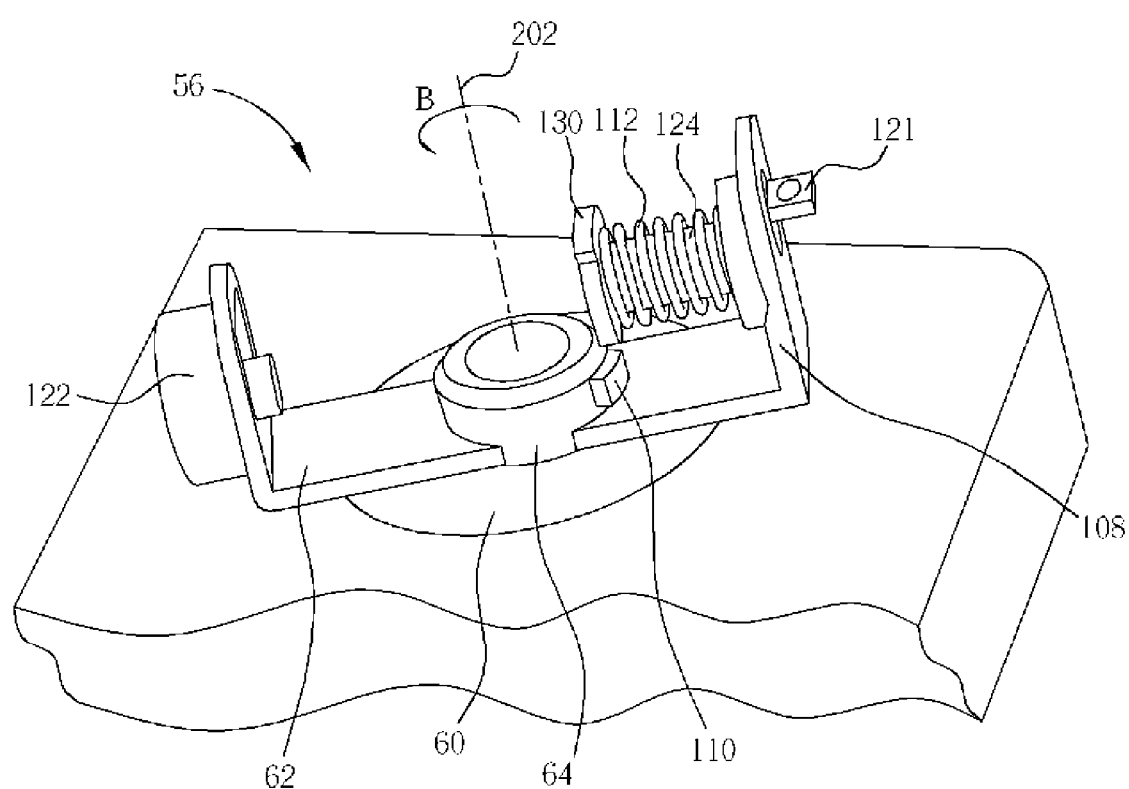
FIG. 4 is a structural diagram of preferred embodiment of the connection device according to the present invention.
Figure 5:
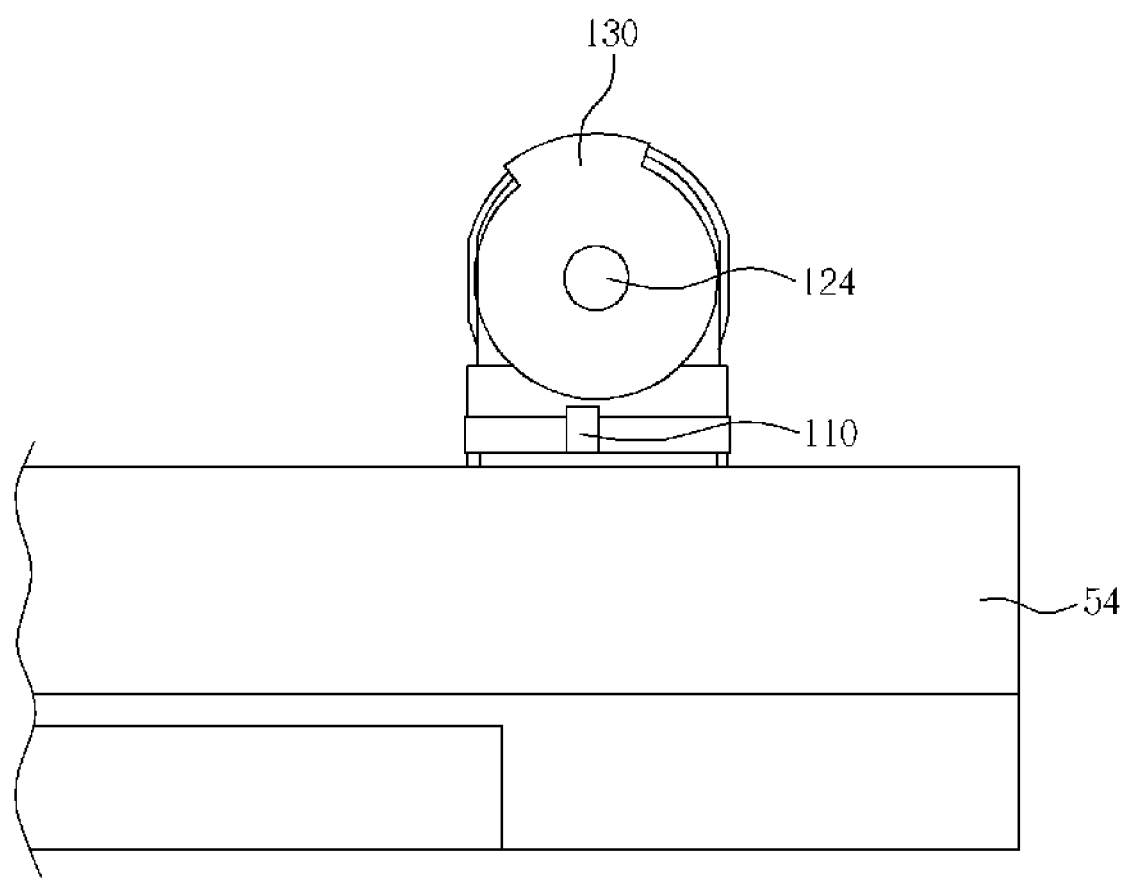
FIG. 5 illustrates relative positions of the protrusion and the stopper of the connection device in FIG. 4.
Figure 6:
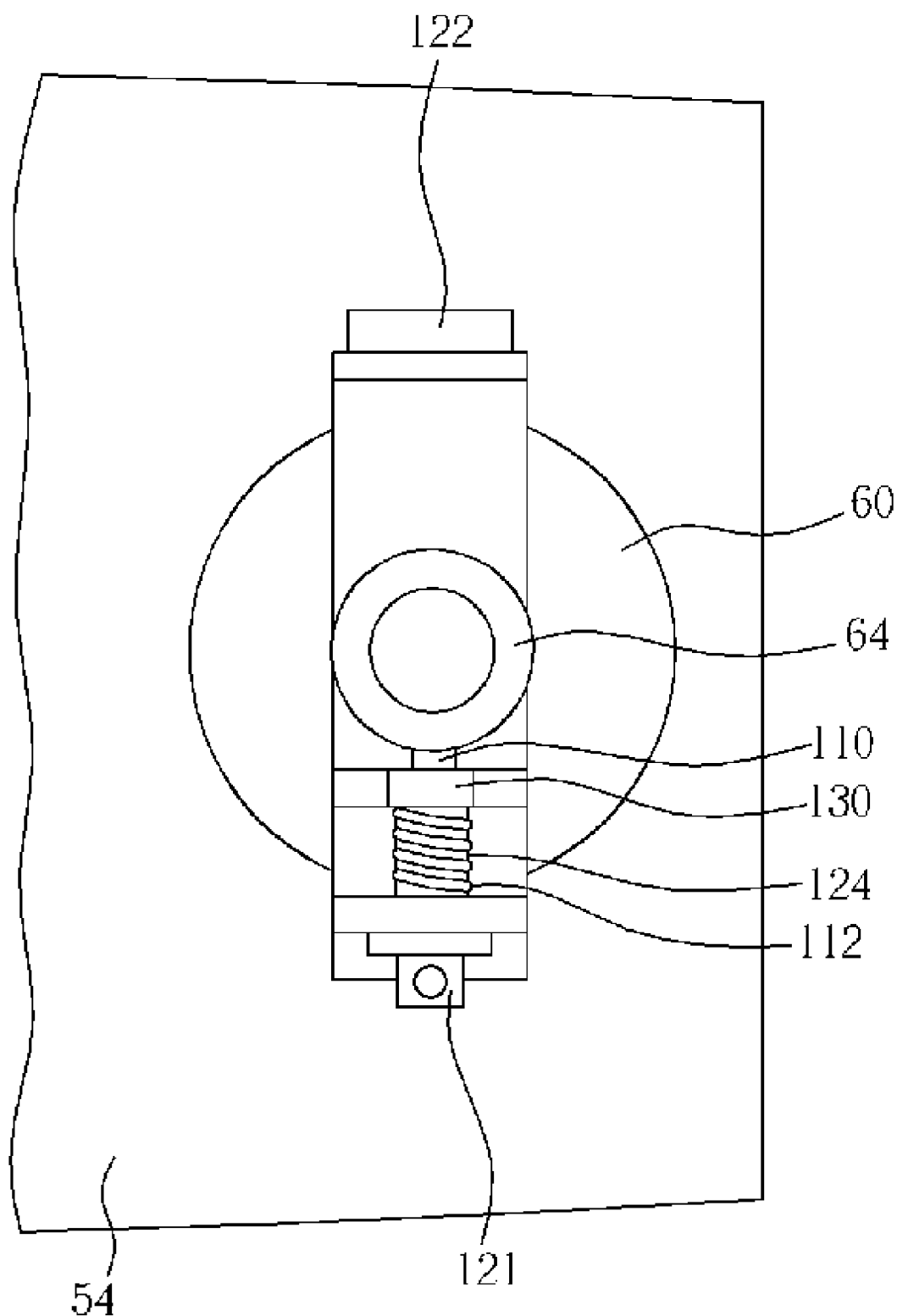
FIG. 6 is a top view of the connection device depicted in FIG. 4.

Please refer to FIGS. 4 to 6. FIG. 4 is a structural diagram of a preferred embodiment of the connection device 56 according to the present invention. FIG. 5 illustrates relative positions of the protrusion 130 and the stopper 110 of the connection device 56 in FIG. 4. FIG. 6 is a top view of the connection device 56 depicted in FIG. 4. The base 60 of the connection device 56 is installed on the bottom module 54 and a first pivot 64 is installed on the base 60. The rotation supporter 62 is assembled with the first pivot 64 having a stopper 110. The rotation supporter 62 is capable of rotating around the second axis 202 in the direction of arrow B. The rotation supporter 62 includes a side wall 108, a first buckle 121, and a second buckle 122. The first buckle 121 and the second buckle 122 are used to buckle the top module 52 so that the top module 52 is able to rotate around the first axis 201 illustrated in FIG. 2 in the direction of arrow A. The rotation supporter 62 comprises a second pivot 124 having a protrusion 130. The protrusion 130 rotates in the same direction as the rotation of the first buckle 121 while the top module 52 rotating in the direction of arrow A shown in FIG. 2. One side of the flexible portion 112 is coupled to the protrusion 130 and the other side is affixed to the side wall 108.

Figure 7:
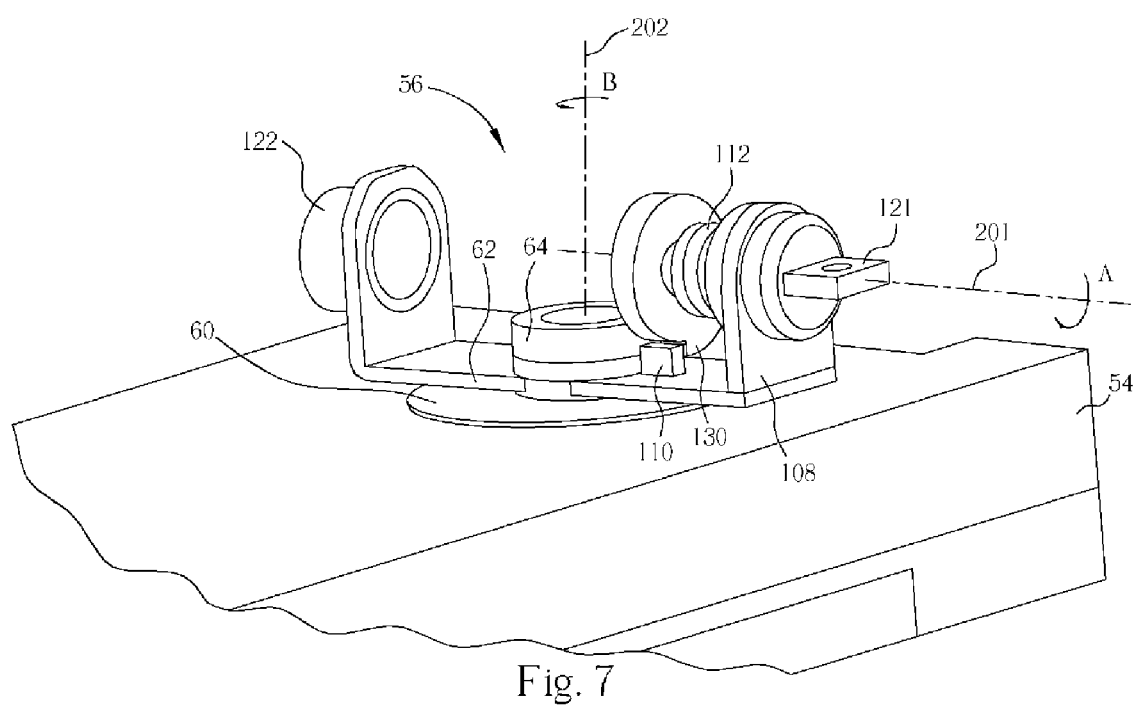
FIG. 7 is a diagram of the connection device depicted in FIG. 4 after the top module rotates by a specific angle.
Figure 8:
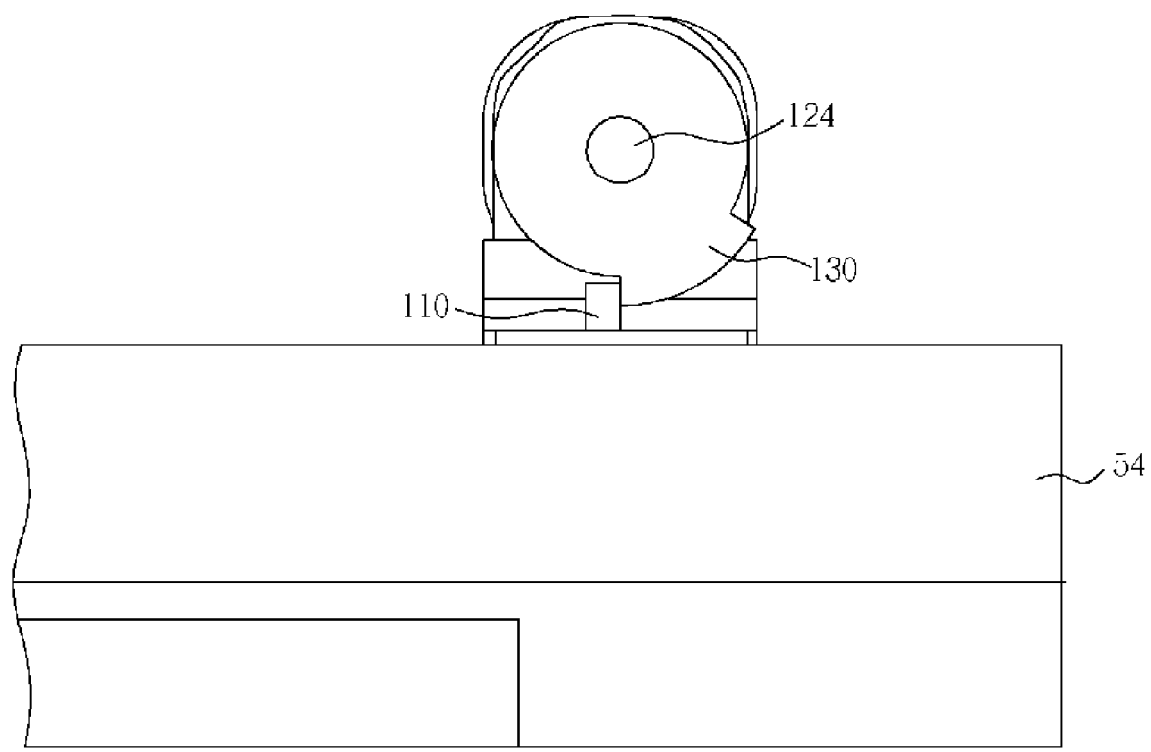
FIG. 8 and FIG. 9 illustrate the relative positions of the protrusion and the stopper of the connection device depicted in FIG. 7.
Figure 9:
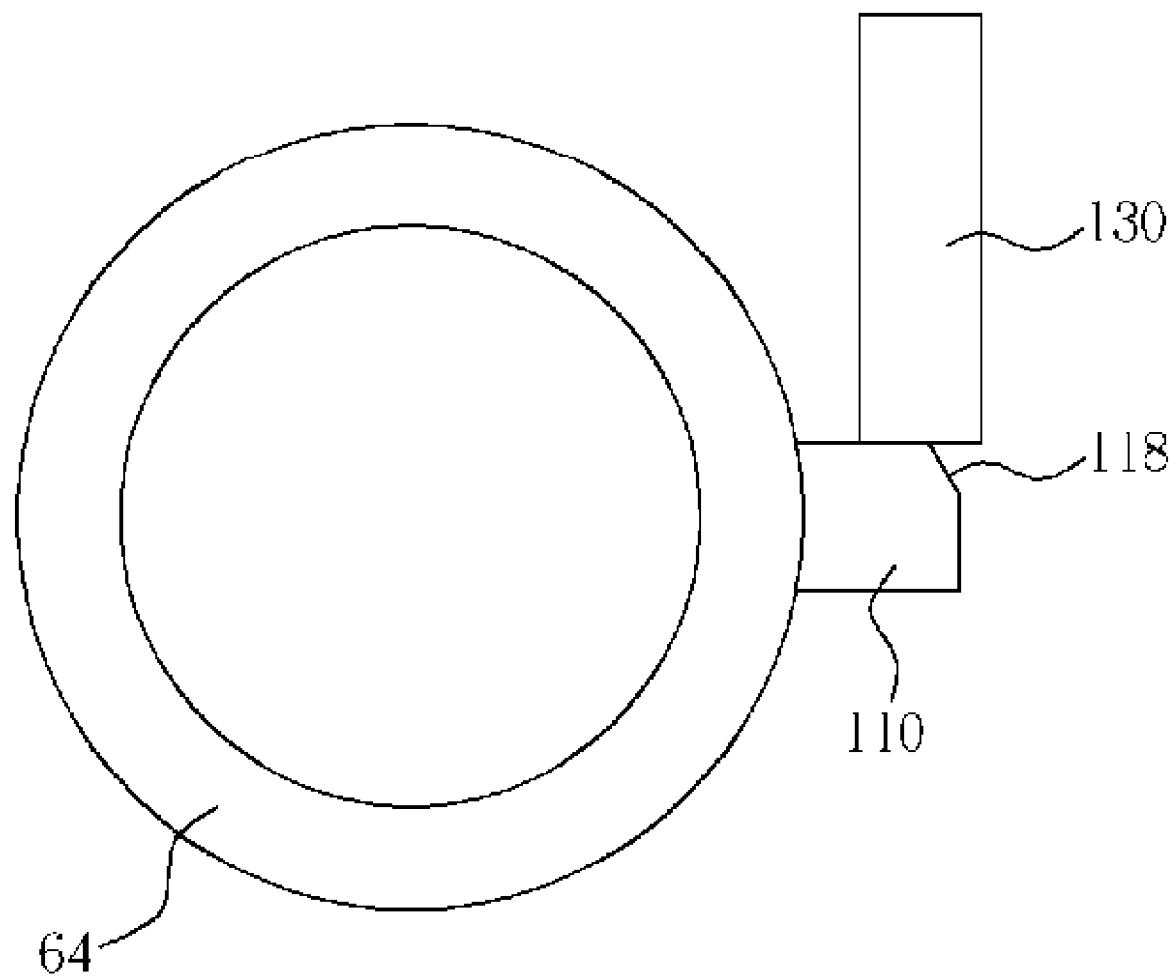

Please refer to FIG. 7, FIG. 8, and FIG. 9. FIG. 7 is a diagram of the connection device 56 after the top module 52 rotates by a specific angle. FIG. 8 and FIG. 9 illustrate the relative positions of the protrusion 130 and the stopper 110 of the connection device 56 depicted in FIG. 7. As shown in FIG. 7 and FIG. 8, because the protrusion 130 rotates as the top module 52 is unfolded, the rotated protrusion 130 will be obstructed by the stopper 110. In doing so, the top module 52 connected to the first buckle 121 can not further rotate around the first axis 201 in the direction of arrow A, resulting in an included angle of 160 degrees between the top module 52 and the bottom module 54.

Figure 10:
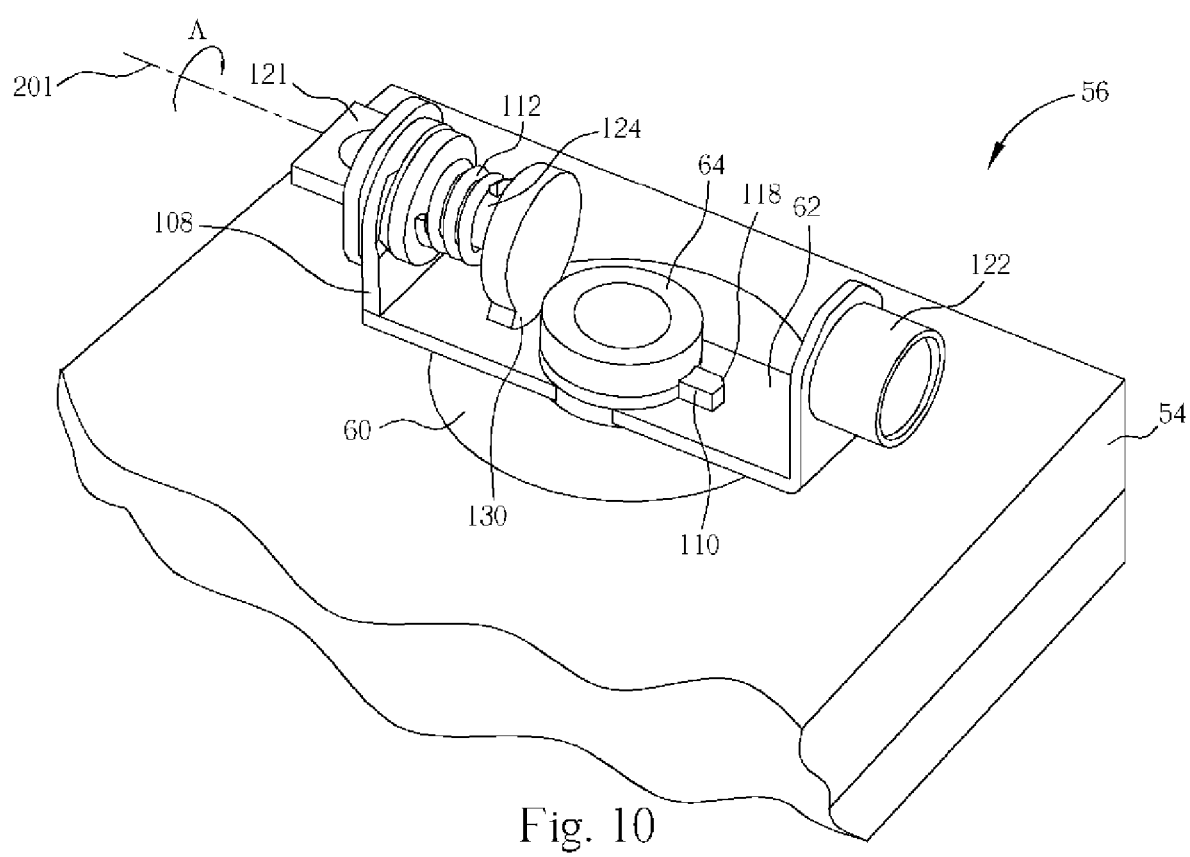
FIG. 10 is a diagram showing the top module in FIG. 7 rotated an angle of 90 degrees around the second axis in the direction of arrow B.
Figure 11:
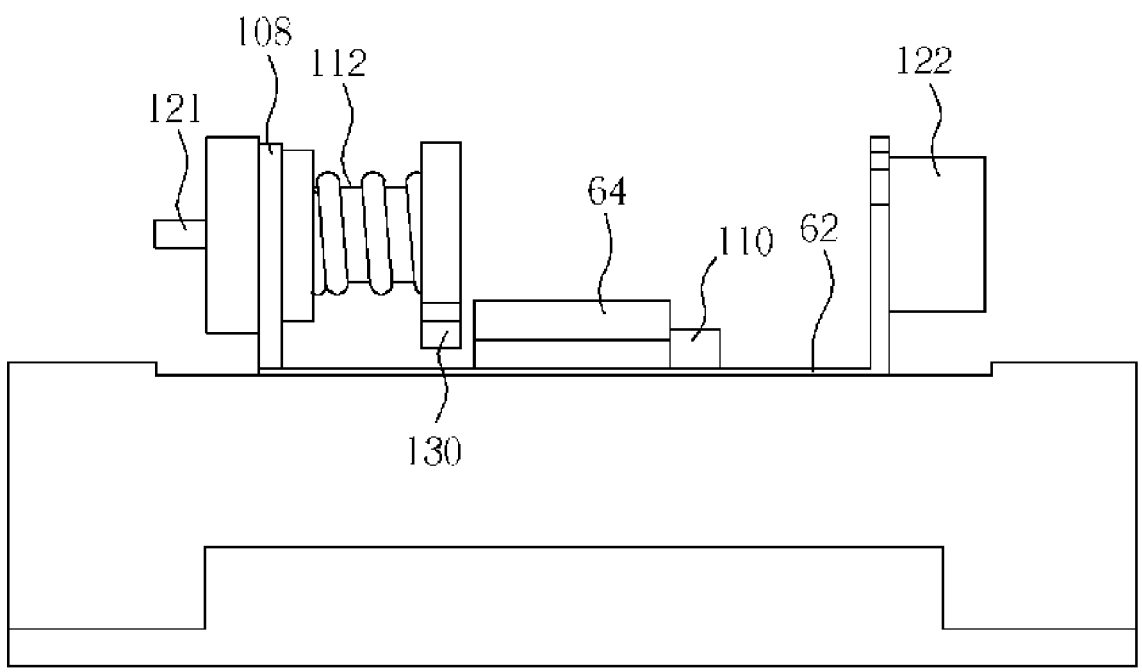
FIG. 11 is a side view of FIG. 10.

Please refer to FIG. 10 with reference to FIG. 11. FIG. 10 is a diagram showing the top module 52 in FIG. 7 rotating an angle of 90 degrees around the second axis 202 in the direction of arrow B. FIG. 11 is a side view of FIG. 10. The rotation supporter 62 will rotate around the second axis 202 in the direction of arrow B along with the top module 52 while the top module 52 is rotating around the second axis 202 in the direction of arrow B. The first pivot 64 and the stopper 110 affixed thereto, however, are not going to follow the rotation of the rotation supporter 62. As illustrated in FIG. 10 and FIG. 11, the protrusion 130 will not block the stopper 110 after the rotation of the top module 52 (or the rotation supporter 62). In consequence, the top module 52 is capable of rotating around the first axis 201 in the direction of arrow A so that the included angle between the top module 52 and the bottom module 54 is adjusted from 160 degrees to 180 degrees.

Figure 12:
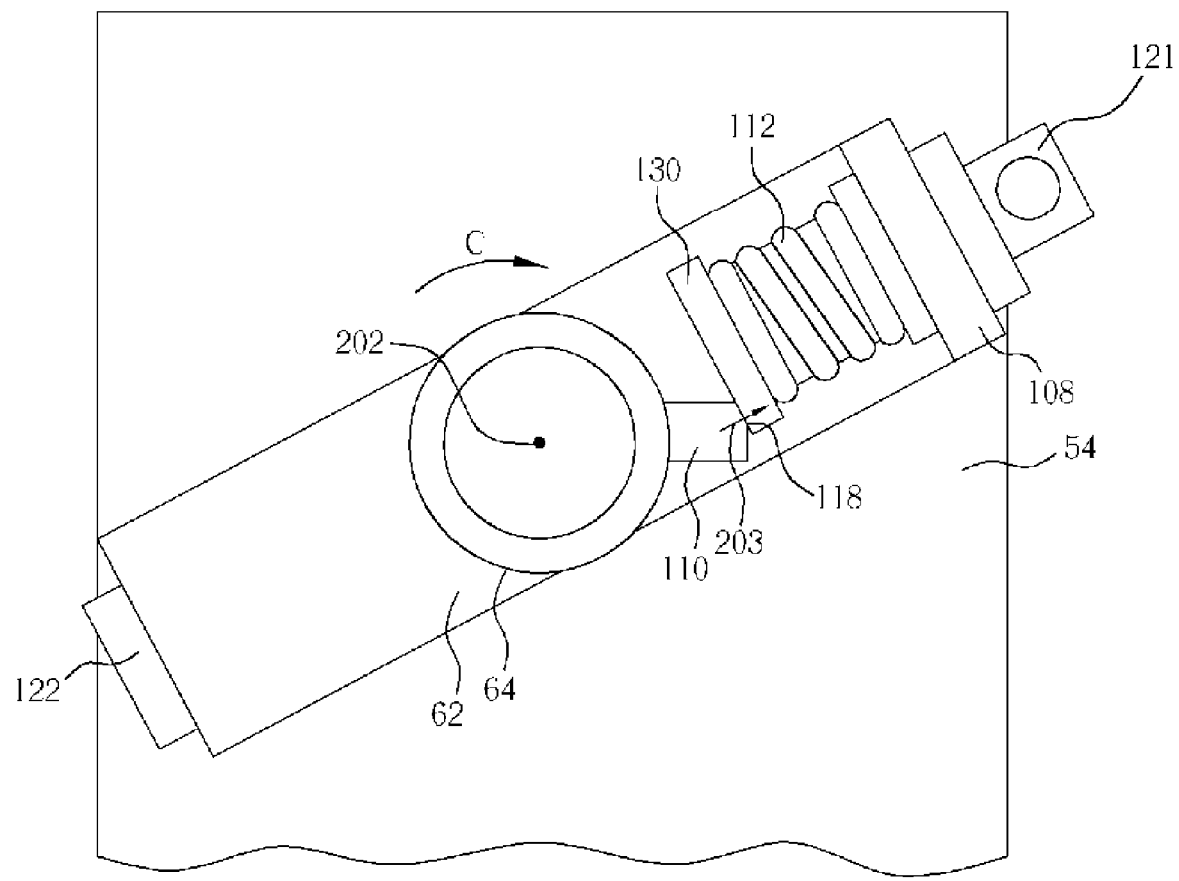
FIG. 12 is a diagram illustrating the top module in FIG. 10 rotated 90 degrees around the second axis in the direction of arrow C.
Figure 13:
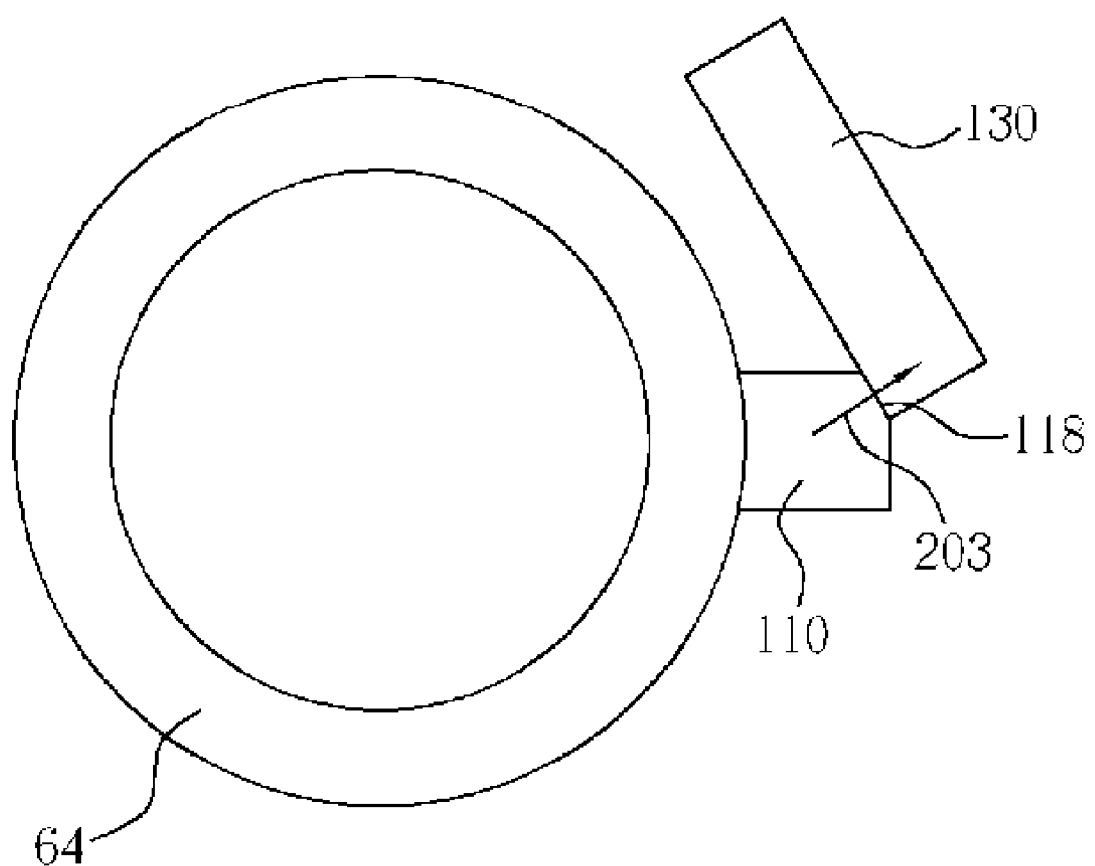
FIG. 13 is a diagram of relative positions of the protrusion and the stopper in FIG. 12.

Please refer to FIG. 10, FIG. 12 and FIG. 13. FIG. 12 is a diagram where the top module 52 in FIG. 10 has rotated 90 degrees around the second axis 202 in the direction of arrow C. FIG. 13 is a diagram of relative positions of the protrusion 130 and the stopper 110 in FIG. 12. When the top module 52 in the condition of FIG. 10 rotates around the second axis 202 in the direction of arrow C, a force (like the direction arrow 203 shows) is applied to the protrusion 130 while the inclined plane 118 of the stopper 110 contacts with the protrusion 130, and the flexible portion 112 connected to the protrusion 130 is compressed until the inclined plane 118 does not contact with the protrusion 130. That is to say, in a course of the inclined plane 118 contacting the protrusion 130, in one aspect, the protrusion 130 will rotate in the direction of arrow C, and, in the other aspect, will move in the direction of arrow 203 so that the stopper 110 fails to obstruct the protrusion 130. Under the circumstances, the top module 52 which is capable of rotating along with the rotation of protrusion 130 can freely rotate around the second axis 202 in the condition that the included angle between the top module 52 and the bottom module 54 is 180 degrees.

Figure 14:
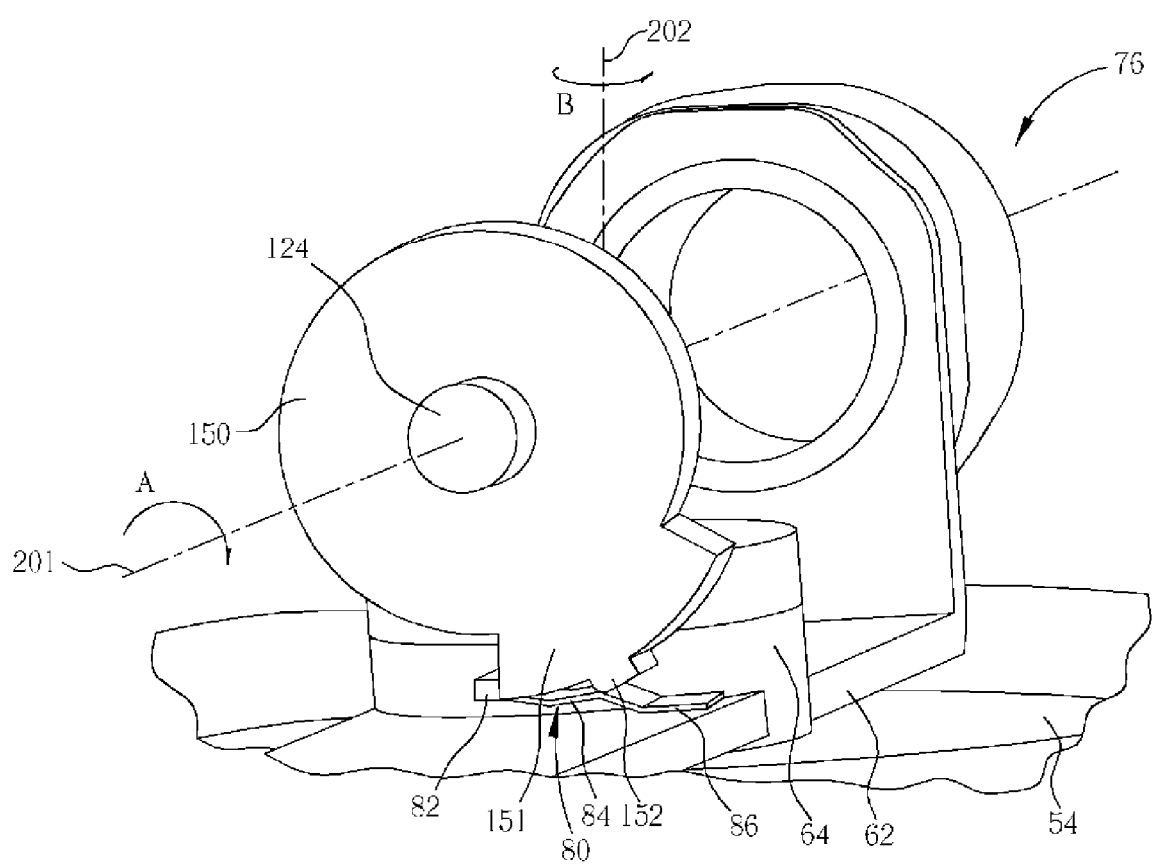
FIG. 14 is a structure diagram of a second embodiment of a connection device according to the present invention.
Figure 15:
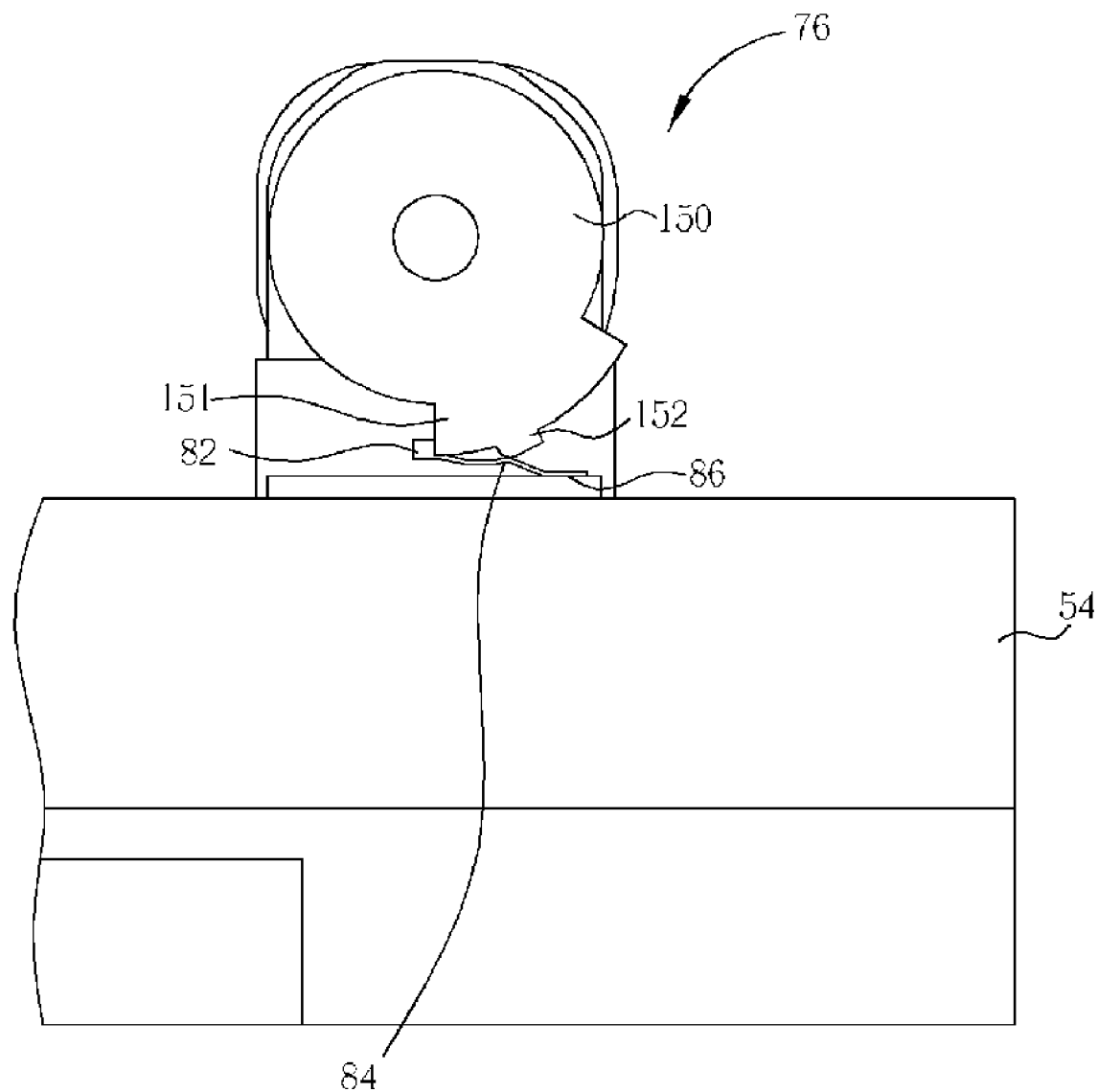
FIG. 15 is a side view of FIG. 14.

Please refer to FIG. 14 with reference to FIG. 15. FIG. 14 is a structure diagram of a second embodiment of a connection device 76 according to the present invention. FIG. 15 is a side view of FIG. 14. Differing from the connection device 56, the connection device 76 comprises a protrusion 150 installed on a second pivot 124 and a flexible member 80 set up on the first pivot 64. The flexible member 80 comprises a fixed side 86 affixed to the first pivot 64, a stopper 82, and a flexible connection 84 between the fixed side 86 and the stopper 82. The protrusion 150 includes a first block portion 151 and a second block portion 152 formed monolithically. The first block portion 151 of the protrusion 150 will be obstructed by the stopper 82, leading to the top module 52 failure to rotate when the top module 52 rotates around the first axis 201 in the direction of arrow A as shown in FIG. 14. At this moment, the included angle between the top module 52 and the bottom module 54 shows 160 degrees right now.

Figure 16:
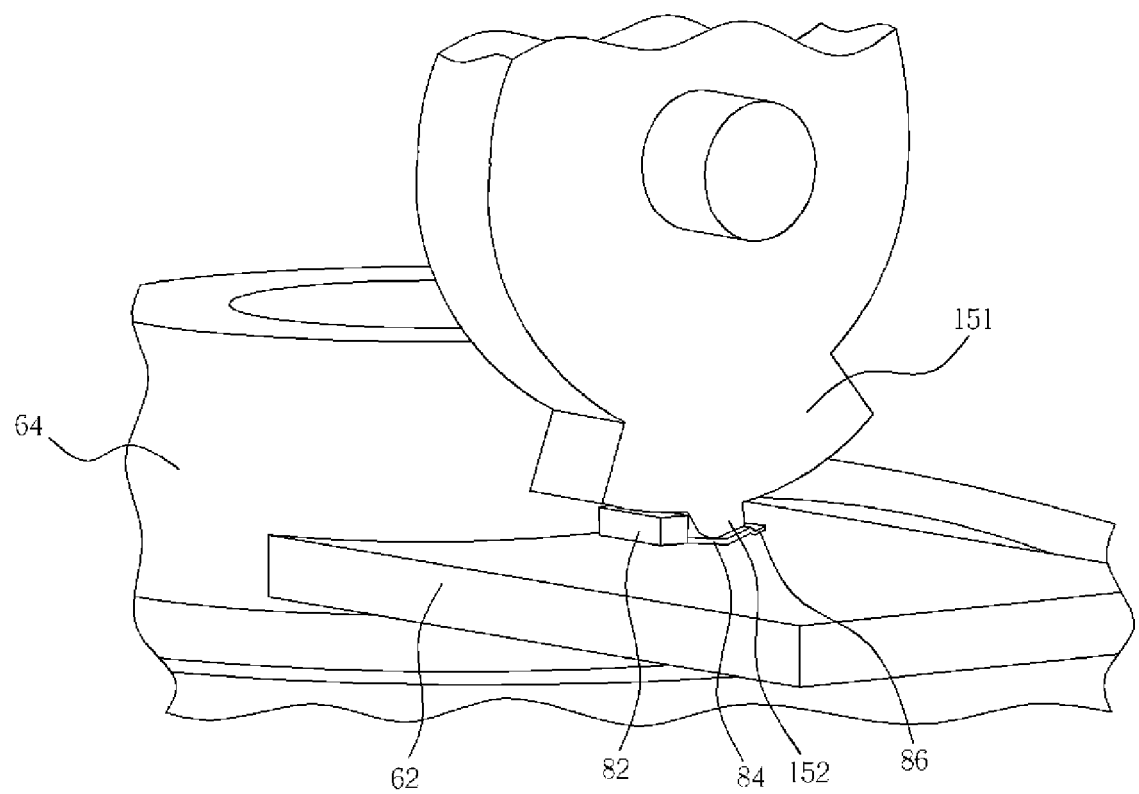
FIG. 16 is diagram illustrating the connection device rotated around the second axis.
Figure 17:
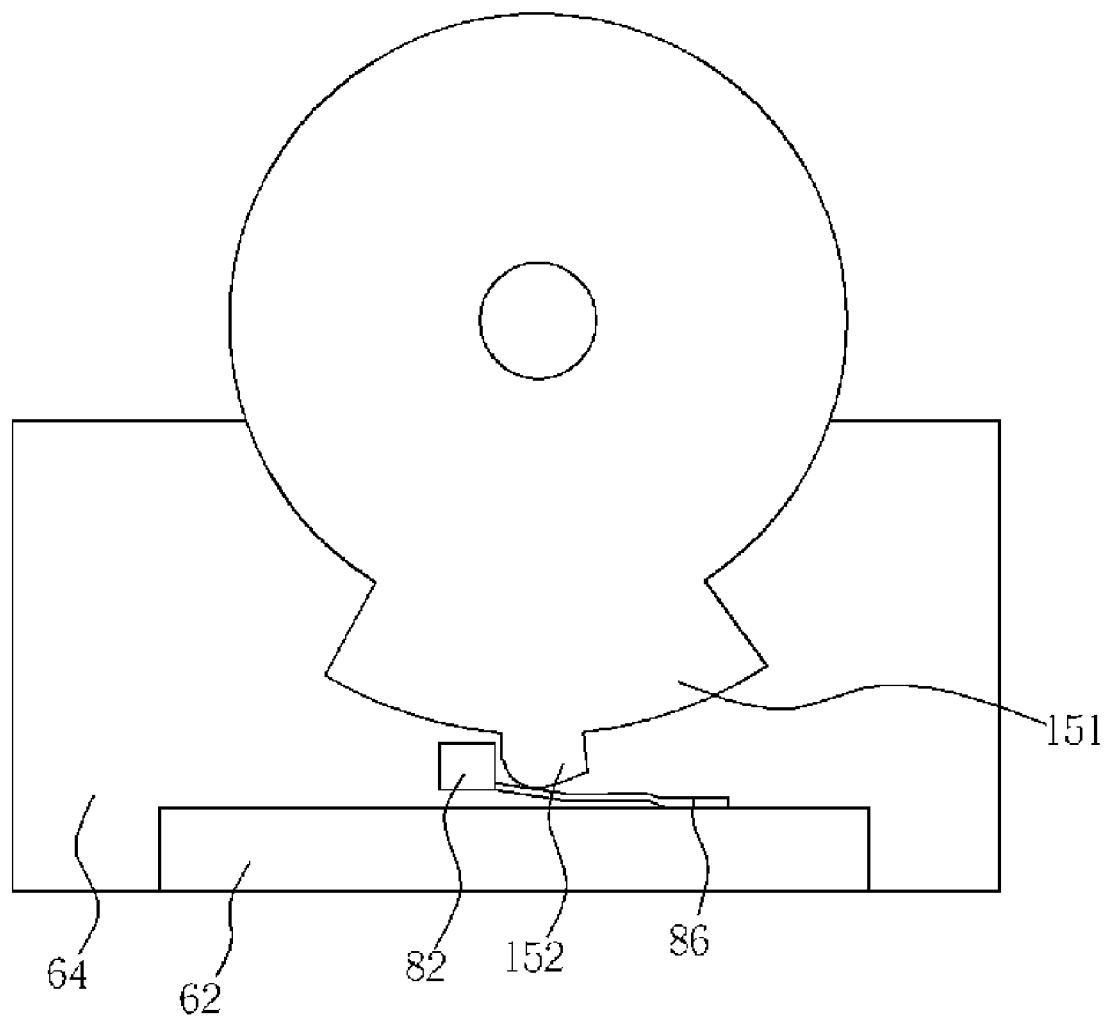
FIG. 17 is a side view of FIG. 16.

Please refer to FIG. 14, FIG. 16 and FIG. 17. FIG. 16 is diagram where the connection device 76 has rotated around the second axis 202. FIG. 17 is a side view of FIG. 16. As illustrated in FIG. 14, after the top module 52 rotates around the second axis 202 in the direction of arrow B, on account of the installation of the protrusion 150 on the rotation supporter 62, the rotation supporter 62, which has rotated around the second axis 202 in the direction of arrow B, will make the first block portion 151 of the protrusion 150 stop blocking the stopper 82. For the time being, the top module 52 is able to further rotate around the first axis 201 in the direction of arrow A, which results in the included angle of 180 degrees between the top module 52 and the bottom module 54. Afterwards, the top module 52 can rotate around the second pivot in the reverse direction of arrow B. Because the second block portion 152 can compress the flexible connection 84 and be stopped by the stopper 82, the included angle between the top module 52 and the bottom module 54 is substantially 180 degrees.

The mobile phone 50 further comprises a pivot protection cover 180 for enclosing the base 60 and the rotation supporter 62 of the connection devices 56, 76 to protect the components from dirt or outside damage and for aesthetic reasons. For simplicity, the pivot protection cover 180 is only shown in FIG. 4.

A skilled person in this art should understand that the included angle of 160 degrees between the top module 52 and the bottom module 54 is just one embodiment of the present invention and not limiting. In addition, although the embodiments in the present invention take a mobile phone as illustration, the connection device 56 in the present invention is capable of being applied to other electrical devices such as notebook computers.

Compared to the prior art, the connection device 56 of the present invention sets the included angle between the top module 52 and the bottom module 54 to be 160 degrees when the top module 52 is fully lifted, which is desirable for ergonomic reasons, rather than 180 degrees. In addition, the fully lifted top module can still be rotated to make the included angle between the top module 52 and the bottom module 54 to be 180 degrees. In doing so, the user is capable of adjusting the included angle between the top module 52 and the bottom module 54 to 160 degrees when conversing using the mobile phone 50 of the present invention. If the user wants to take a photo with the mobile phone 50, the user is able to adjust the included angle between the top module 52 and the bottom module 54 to be 180 degrees, which conforms to the ergonomics to take a photo more naturally.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An electrical device comprising:
   a top module having a panel for displaying an image;
   a bottom module having a plurality of buttons for controlling the operation of the electrical device;
   a base affixed on the bottom module;
   a first pivot extending out of the base;
   a rotation supporter installed on the first pivot; and
   a second pivot installed on the rotation supporter, the top module rotatably affixed to the second pivot, the second pivot having a protrusion for propping up a stopper of a flexible member as the top module rotates around the second pivot by a predetermined angle so as to maintain the predetermined angle between the top module and the bottom module, wherein the stopper comprises an inclined plane, and the stopper is incapable of blocking the protrusion as the inclined plane contacts the protrusion while the top module rotates around the first pivot.

2. The electrical device of claim 1 wherein the rotation supporter is capable of rotating around a first axis and the top module is capable of rotating around a second axis, wherein the first axis is perpendicular to the second axis.

3. The electrical device of claim 1 wherein the predetermined angle is substantially 160 degrees.

4. The electrical device of claim 1 further comprising a pivot protection for enclosing the rotation supporter and the base.

5. The electrical device of claim 1 wherein the protrusion rotates with the rotation of the top module while the top module is rotating around the second pivot.

6. The electrical device of claim 1 further comprising a flexible portion, one end of which connects to the rotation supporter and the other end of which connects to the protrusion, for applying a force to the protrusion until the protrusion contacts the inclined plane.

7. The electrical device of claim 1 being a mobile phone.

8. The electrical device of claim 1 being a notebook computer.

9. An electrical device comprising:
   a top module having a panel for displaying image;
   a bottom module having a plurality of buttons for controlling the operation of the electrical device;
   a base fixed on the bottom module;
   a first pivot extending out of the base;
   a flexible member connected to the first pivot and having a stopper;
   a rotation supporter installed on the first pivot;
   a second pivot installed on the rotation supporter, the top module rotatably affixed to the second pivot; and
   a protrusion having a first block portion for propping up the stopper of the flexible member as the top module rotates around the second pivot by a predetermined angle so as to maintain the predetermined angle between the top module and the bottom module, and a second block portion for propping up the stopper of the flexible member as the top module rotates around the first pivot.

10. The electrical device of claim 9 wherein the first block portion and the second block portion are formed monolithically.

11. The electrical device of claim 9 wherein the rotation supporter is capable of rotating around a first axis and the top module is capable of rotating around a second axis, wherein the first axis is perpendicular to the second axis.

12. The electrical device of claim 9 wherein the predetermined angle is substantially 160 degrees.

13. The electrical device of claim 9 further comprising a pivot protection for enclosing the rotation supporter and the base.

14. The electrical device of claim 9 wherein the protrusion rotates with the rotation of the top module while the top module is rotating around the second pivot.

15. The electrical device of claim 9 being a mobile phone.

16. The electrical device of claim 9 being a notebook computer.

* * * * *